United States Patent
Ho et al.

(10) Patent No.: US 6,915,352 B2
(45) Date of Patent: Jul. 5, 2005

(54) INFRARED TRANSMISSION SYSTEM WITH AUTOMATIC CHARACTER IDENTIFICATION

(75) Inventors: David Ho, Taipei Hsieng (TW); Tony Tsai, Taipei Hsieng (TW); Wei Han, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 757 days.

(21) Appl. No.: 09/870,629

(22) Filed: Jun. 1, 2001

(65) Prior Publication Data

US 2002/0194352 A1 Dec. 19, 2002

(51) Int. Cl.⁷ .......................... G06F 15/16; G06F 15/00; G06F 17/00
(52) U.S. Cl. .......................... 709/246; 709/219; 715/536
(58) Field of Search ................................ 715/536, 542, 715/703, 541; 709/217–219, 246–247; 235/462.01–462.46, 472.01–472.02; 382/232, 321, 236, 309; 710/70

(56) References Cited

U.S. PATENT DOCUMENTS

| | | | | |
|---|---|---|---|---|
| 6,154,758 A | * | 11/2000 | Chiang | ......................... 715/541 |
| 6,262,735 B1 | * | 7/2001 | Etelapera | ................... 345/854 |
| 6,622,122 B1 | * | 9/2003 | Fukushige et al. | ........... 704/257 |
| 2002/0073217 A1 | * | 6/2002 | Ma et al. | ..................... 709/230 |
| 2002/0075300 A1 | * | 6/2002 | Tang et al. | .................. 345/744 |
| 2002/0120654 A1 | * | 8/2002 | Xu | .............................. 707/536 |

FOREIGN PATENT DOCUMENTS

| | | | | |
|---|---|---|---|---|
| DE | 019508017 A1 | * | 9/1996 | ............ H04B/1/38 |
| JP | 402135568 A | * | 5/1980 | ........... G06F/15/20 |

* cited by examiner

*Primary Examiner*—David Wiley
*Assistant Examiner*—Joseph E. Avellino
(74) *Attorney, Agent, or Firm*—Bacon & Thomas, PLLC

(57) ABSTRACT

An infrared transmission system with automatic character identification is disclosed. In the process of identifying a selected type of internal code contained in information sent from a sender device, check whether the value of each character contained in the sent information is within a default range of a specific internal code, discard all internal codes having values other than the default range, perform an conversion and an analysis on the qualified information based on the value of internal code thereof, select those less frequently appeared and qualified types of internal codes as the types of internal codes, and convert the received information into one having the type of internal code compatible to the recipient device. This can prevent random codes from occurring, show the correct information at the recipient device, carry out an errorless information communication and exchange between various electronic devices supporting software of different languages.

4 Claims, 2 Drawing Sheets

INFRARED TRANSMISSION SYSTEM WITH AUTOMATIC CHARACTER IDENTIFICATION

FIELD OF THE INVENTION

The present invention relates to infrared transmission and more particularly to an infrared transmission system with automatic character identification.

BACKGROUND OF THE INVENTION

As technology progresses, data recording and storage have evolved from by pen and paper to by a digital device such as personal digital assistant (PDA), mobile phone, etc. Information related to our daily life and work may be stored by them. Also, information may be transmitted and exchanged by such digital devices. In general, transmission may be performed in a wired or wireless manner. As to most wired transmission cases, cable is employed as medium for interconnecting a variety of devices, thereby effecting data transmission and/or exchange. It is advantageous for its reliability and quality. However, it is disadvantageous for its poor compatibility and availability. As to most wireless transmission cases, infrared (e.g., IrDA) is employed as medium for effecting data transmission and/or exchange. It is advantageous for reliability, quality, compatibility, availability, and interconnection of various devices because the transmission protocol employed in wireless transmission is highly reliable. Hence, currently wireless transmission has been widely employed in a variety of commercial electronic products. However, problems also found after practical use. For example, programs and computer languages employed in different electronic devices may be different because various manufacturers use different design techniques. Hence, errors may occur when data is transmitted through wireless transmission (particularly infrared transmission) between two different devices having above design difference. Errors are caused by different internal codes and processing techniques. One example of such errors is random code as experienced in the transmission of Chinese information. As a result, useless information (i.e., random code) is received by a recipient. It is really inconvenient. Thus improvement requires.

SUMMARY OF THE INVENTION

It is an object of the present invention to provide an infrared transmission system with automatic character identification wherein in the process of identifying a selected type of internal code contained in information sent from a sender device, first check whether the value of each character contained in the sent information is within a default range of a specific internal code, discard all internal codes having values other than the default range, perform an conversion and an analysis on the qualified information based on the value of internal code thereof, select those less frequently appeared and qualified types of internal codes as the types of internal codes, and convert the received information into one having the type of internal code compatible to the recipient device.

In one aspect of the present invention, by utilizing the electronic devices in accordance with the system of the present invention in transmitting data, a minimized obstruction in information exchange is obtained. Also, the present invention can analyze the received information based on rules of various types of internal codes for identifying the type of internal code used by sender device, and perform a conversion on the information based on the type of internal code for preventing random codes from occurring, thereby showing the correct information at the recipient device.

In another aspect of the present invention, an information exchange between various devices, increased transportability and compatibility of infrared transmission, and errorless information communication between various portable electronic devices supporting software of different languages (i.e., types of internal codes) through infrared transmission are effected.

The above and other objects, features and advantages of the present invention will become apparent from the following detailed description taken with the accompanying drawings.

DETAILED DESCRIPTION OF THE PREFERRED EMBODIMENTS

Figure 1:
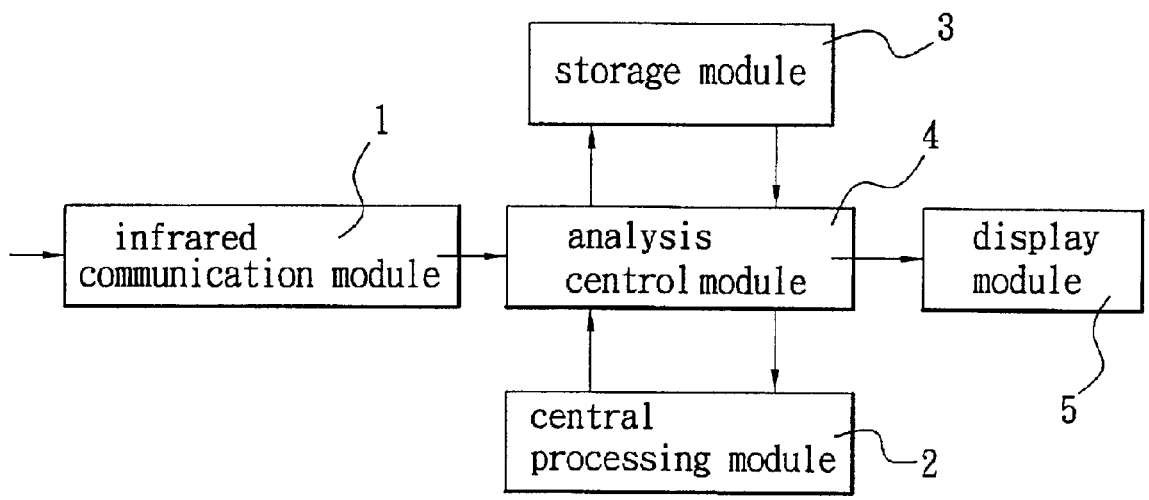
FIG. 1 is a block diagram of an infrared transmission system with automatic character identification according to the invention.
Figure 2:
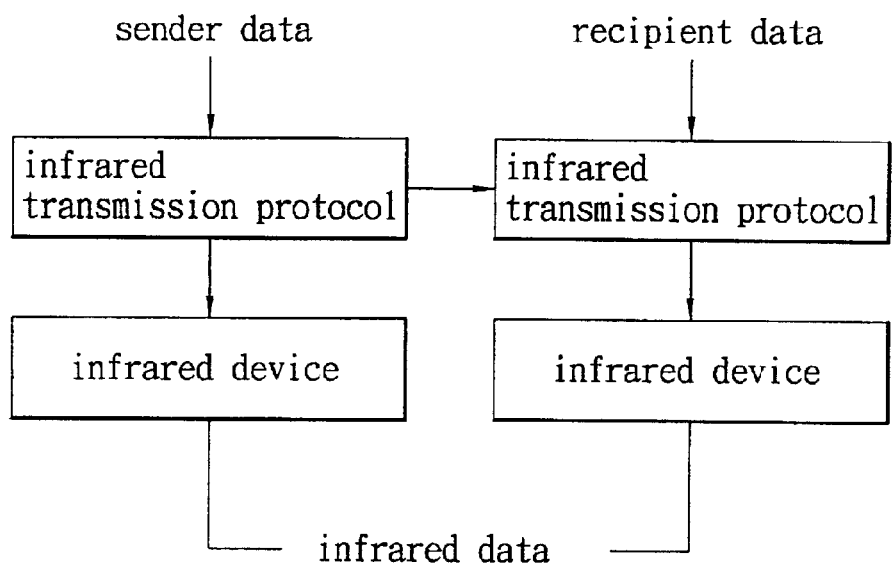
FIG. 2 is a schematic diagram illustrating data transmission process between sender and recipient through infrared devices.

Referring to FIGS. 1 and 2, there is shown a block diagram of an infrared transmission system with automatic character identification and a schematic diagram illustrating a data transmission process between sender and recipient through infrared devices in accordance with the invention. The system is incorporated in a digital device having infrared transmission capability such as personal digital assistant (PDA), mobile phone, etc. The system comprises an infrared communication module 1, a central processing module 2, a storage module 3, an analysis control module 4, and a display module 5 wherein infrared communication module 1 acts to communicate with a sender device so as to receive information sent from sender through infrared transmission protocol and infrared device and maintain the integrity of information during transmission. Infrared device acts to effect a data communication, while infrared transmission protocol acts to effect a reliable information transmission. Central processing module 2 consists of a central processing unit (CPU) and associated circuitry. All calculation oriented processes are performed by central processing module 2. Central processing module 2 performs a calculation based on instructions sent from analysis control module 4 and sends back the result to analysis control module 4. Storage module 3 is used to store data required by analysis control module 4 when central processing module 2 performs a calculation. Storage module 3 is implemented as random access memory (RAM) and read only memory (ROM). RAM is used to store information related to control and calculation processes. ROM is used to store permanent data. Analysis control module 4 acts to analyze received data for identifying the type of internal code used and converts it into a type of internal code identifiable by the device of the invention. Display module 5 acts to decode the type of internal code received from a recipient device and show the same. Hence, a recipient may understand information sent from sender. In the embodiment, display module 5 is a liquid crystal display (LCD).

In the embodiment, infrared communication module 1 sends information to analysis control module 4 after receiving the same from sender device. Then an instruction is sent to central processing module 2 by analysis control module 4 based on instructions and messages stored in the memory of storage module 3. Next, central processing module 2 is commanded to perform a calculation, analysis and internal code conversion on the received information. As a result, the processed information sent from central processing module 2 through analysis control module 4 is shown on display module 5. It is understood that in the embodiment, infrared devices are employed to establish a connection between sender and recipient. The sent information is packetized by an infrared transmission protocol (e.g., IrDA). Hence, recipient has to decode the packetized information by utilizing another infrared transmission protocol when information is received at infrared device from sender.

In general, an infrared transmission protocol is implemented as a variety of sub layers as shown in FIG. 2 specifically. It is required that a specific format is employed by infrared transmission protocol in data communication. Hence, recipient device must know the correct internal code contained in information sent from sender device. Otherwise, the converted information in recipient device may be erroneous if there is an inconsistency between the type of internal code of sender device and that of recipient device. As a result, recipient can not obtain correct information from the shown random codes. For example, if Big5 code is employed in the traditional Chinese system at recipient device and ACSII is employed in the English system at sender device. It is designed that a code having a value larger than 127 is defined as a character of an European language other than English. As to Big5 code, a Chinese word consists of two ASCII characters. Further, it is possible for recipient device to process the received English characters as Big 5 characters, resulting an error. Such error is often found not only in the case of data transmission between two different languages but also in the case between two different internal code systems of the same language. For example, in the latter case random codes may be shown after information transmitted from a Big5 system to a Unicode system or vice versa. As such, it is required to implement an errorless identification procedure in the system in order to correctly decode the received information and obtain the decoded type of internal code.

As to identification of the type of internal code, a plurality of characteristics of internal code such as value of internal code, occurrence frequency, and combination rule are required to be analyzed. It is designed that an internal code has a default range of value. For example, the value of ASCII code is at the range between 0 and 127. Each of Big5 and GB code of Chinese consists of two bytes wherein the first byte has a value larger than 127. Also, each of first and second ASCII codes has a default range of value. Unicode consists of two ASCII codes. UTF-8 code is the processed Unicode and consists of one, two, three, or four ASCII codes. Also, each ASCII code of UTF-8 has a default range of value.

It is understood that most words transmitted in the system are frequently used. As to those non-frequently used words, it is rare for them to appear on the transmitted information. Further, information is expressed in the form of internal code. Hence, it is possible to identify the type of internal code of information from its value. However, it is also possible of erroneously identifying information because there is a superposition between two different types of internal codes. For example, each first ASCII character of Big5 and GB comprises a value between 0xb0 and 0xf7. Further, each second ASCII character thereof comprises a value between 0xa1 and 0xfe. Hence, other characteristics of internal codes have to be also identified in order to obtain the correct information. In the system of the invention, the identification of selected type of internal code is based on the occurrence frequency of rarely or less frequently appeared words. In other words, the higher occurrence frequency of non-frequently used words the higher the possibility of error of the selected type of internal code. Otherwise, it is assumed to be correct.

In the process of identifying a selected type of internal code in the system, first check whether the value of each character contained in the sent information is within a default range of a specific internal code. All internal codes having values other than the default range are discarded. Then an conversion and an analysis are performed on the qualified information based on the value of internal code thereof. Next, those less frequently appeared and qualified types of internal codes are selected as the types of internal codes while discarding those frequently used words. Then the received information is converted into one having the type of internal code compatible to the recipient device. As a result, a correct information may be shown on display module 5. In the above conversion process, a conversion table stored in storage module 3 is intensively used. Further, the larger the number of conversion tables the faster the conversion process. That is, the smaller the number of conversion tables the higher the number of conversion tables are used in the conversion, resulting in a prolonging of conversion process and decrease of conversion speed. In the system of the invention, conversion table is a value table with a variety of types of internal codes of a corresponding character and is stored in ROM. Preferably, a source code and a corresponding object code is the format implemented by the table for increasing the amount of data stored in memory and facilitating access.

| source code | object code |
| --- | --- |
| 0x626d (扭) | 0xa7e1 |
| 0x626e (扮) | 0xa7ea |
| 0x626f (址) | 0xa7e8 |
| ... | ... |
| 0x62d3 (拓) | 0xa9dd |
| 0x62d4 (拔) | 0xa9de |
| ... | ... |

Chinese internal code is now classified as Big5, GB, Unicode, and ASCII codes. Also, various electronic devices utilizing infrared (e.g., IrDA) as transmission medium can support such internal codes. Hence, the invention can effect an identification of the type of internal code by utilizing any of above four Chinese internal codes, by connecting it with Chinese or English devices having infrared transmission capability, and by performing information transmission and exchange.

Figure 3:
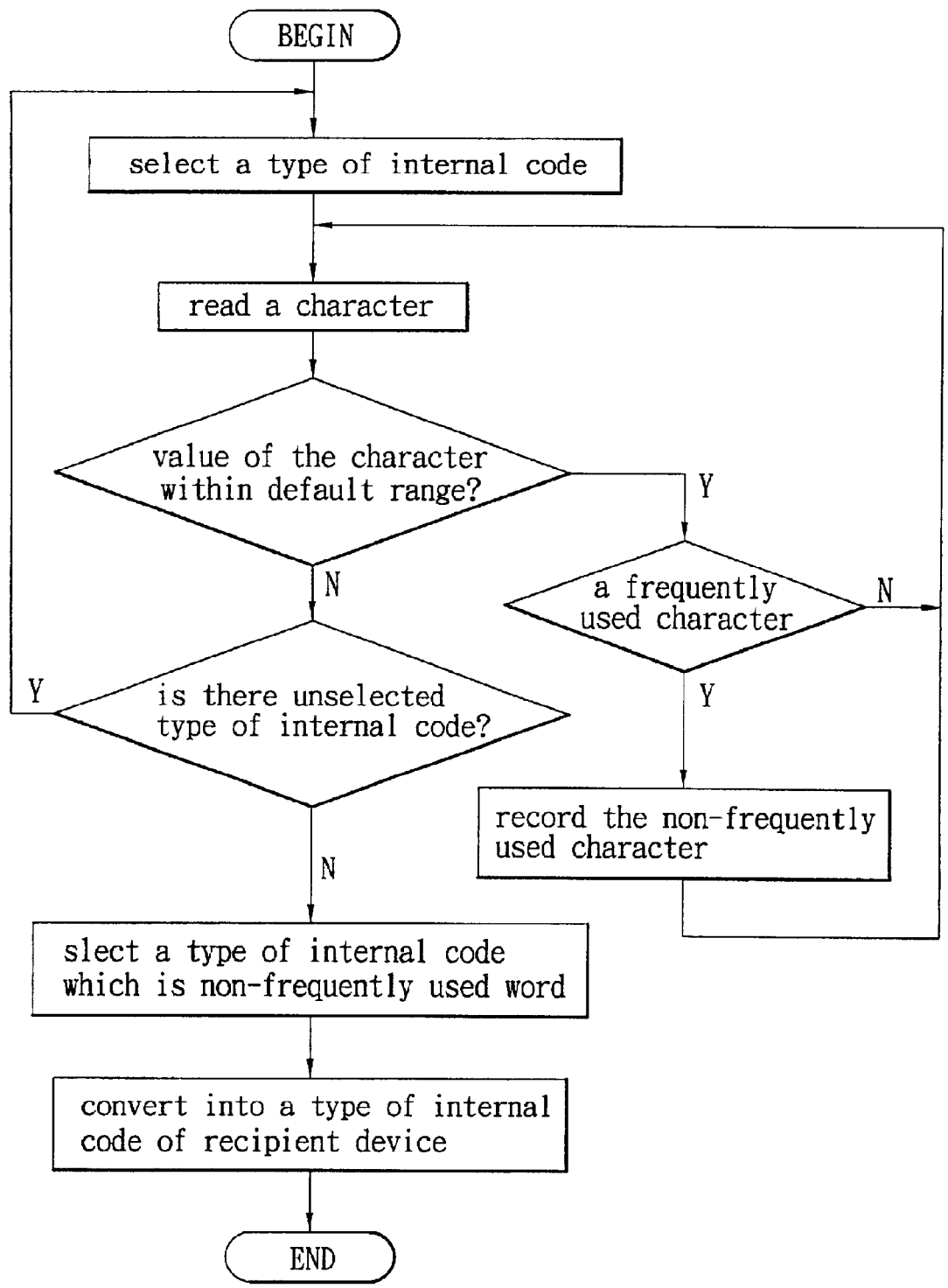
FIG. 3 is a flow chart depicting the process of identifying internal code according to the invention.

In the identification process with respect to the selected types of internal codes performed by the system of the invention, an identification table is established by RAM and following information is stored in the identification table: (1) all types of internal codes, (2) length of information corresponding to respective type of internal code, and (3) the number of non-frequently used words in the information corresponding to respective type of internal code. By identifying above information and in conjunction with the flow chart shown in FIG. 3, a correct type of internal code may be selected after performing the following analysis and identification.

The steps of the process are detailed below. First, sequentially select a type of internal code from the identification table. In a Chinese system, internal code is Big5, GB, Unicode, ASCII, or UTF-8 code (step 10). Then sequentially read a character from the received information (step 20). Next analyze the character in order to determine whether the value thereof is within the range of the selected type of internal code (step 30). If yes, process goes to step 40. Otherwise, process goes to step 50. In step 40, a determination is made whether the character is one of frequently used characters of the selected type of internal code. If yes, record the frequently used character (step 60) and the process loops back to step 20 to read a next character. Otherwise, process goes back to step 20 to read a next character. In step 50, a determination is made whether there is any of other types of internal codes not selected. If yes, the process loops back to step 10 to select another default type of internal code. If not, the process goes to step 70. In step 70, convert the information with respect to the various types of internal codes. Analyze the occurrence frequency of the recorded non-frequently used words. Select a type of internal code which is among the non-frequently used words and has a value within the value range of the type of internal code. The selected type of internal code is viewed as one that transmitted from sender device. Then convert the received type of internal code into one corresponding to the type of internal code of recipient device based on the conversion table (step 80).

Following is a description of a preferred embodiment of the invention in which a PALM based PDA having infrared information exchange capability is employed. Such product can support Chinese. But most above products only have installed Chinese software. The core software of them is still English based one. Further, Unicode is implemented therein. Furthermore, a VCARD format is loaded into infrared transmission protocol for exchanging information. In the PDA embodiment of the system of the invention, a VCARD format document having following programs is received through an infrared transmission system: in which name (e.g., 張三) and office telephone number of a user is sent in the system:
BEGIN: VCARD
VERSION: 1.0
N:CHARSET ISO-8859-1:張三
TEL; WORK; VOICE: 12345678
UID: 6725640
END: VCARD
where N is name written in English alphabets. TEL is office telephone number. BEGIN, END, UID, AND VERSION are system information generated by the PALM PDA not information about user. Hence, PDA may only decode user name and office telephone number after receiving the document. The decoded information is as follows:

User name: {OxB1 Ox69 OxA4 Ox54}.
Office telephone number: {Ox31 Ox32 Ox33 Ox34 Ox35 Ox36 Ox27 Ox38}.

It is found that there are two characters in the type of internal code of user name having values larger than 128 (e.g., OxB1 and OxA4). Further, the core software of PDA is still English based one. Furthermore, Unicode is implemented therein. Hence, the received VCARD document is processed as English document. In view of above, random codes may be generated if analysis and conversion are not performed in accordance with the system of the invention.

In the embodiment, the type of internal code (i.e., OxB1 Ox69 OxA4 Ox54) of user name are analyzed by the system of the invention after receiving information. It is concluded that user name is written in English. Further, OxB169 and OxA454 are not in the default value range of GB code. It is also concluded that the type of internal code of information is Unicode or Big5. Then analyze the same based on possible type of internal code in order to determine the corresponding words. The corresponding words are "線詫" wherein the first word is a non-frequently used one if Unicode conversion is employed. In comparison, the corresponding words are 張三 if Big5 conversion is employed. It is seen that the occurrence frequency of non-frequently used words is relatively low if Big5 is employed to perform a conversion. It is concluded that Big5 is the type of internal code used by sender device. Hence, a correct information (e.g., user name) may be shown if a table for converting Big5 into Unicode is employed.

In the above embodiment, the type of internal code (Ox31 Ox32 Ox33 Ox34 Ox35 Ox36 Ox37 Ox38) of office telephone number are analyzed with respect to ASCII by the system of the invention. It is concluded that office telephone number is written in English since all values of the type of internal code are smaller than 128 (i.e., within the default information range of ASCII). Further, Ox3132, Ox3334, Ox3536 and Ox3738 are not in the default value range of Big5 and GB code (i.e., smaller than 128). It is also found that Ox3231, Ox3433, Ox3635 and Ox3837 are not complied with the rule of Chinese Unicode from 0x4e00 above. It is only found that ASCII is the complied one. In conclusion, ASCII is the type of internal code used by sender device. Hence, a correct information (e.g., office telephone number) may be shown if a table for converting ASCII into Unicode is employed.

In brief, the automatic character identification system of the invention can minimize the obstruction in information exchange, analyze the received information based on rules of various types of internal codes for identifying the type of internal code used by sender device, and perform a conversion on the information based on the type of internal code for preventing random codes from occurring, thereby showing the correct information at the recipient device. This can effect information exchange between various devices, increase transportability and compatibility of infrared transmission, and carry out an errorless information communication between various portable electronic devices supporting software of different languages (i.e., types of internal codes) through infrared transmission.

While the invention has been described by means of specific embodiments, numerous modifications and variations could be made thereto by those skilled in the art without departing from the scope and spirit of the invention set forth in the claims.

What is claimed is:

1. An infrared transmission system for identifying a selected type of internal code contained in information sent from a sender device, comprising:
    an infrared communication module for communicating with said sender device so as to receive information sent from the sender device through an infrared transmission protocol and an infrared device and maintain integrity of said send information, said infrared device being operable for effecting a data communication, and said infrared transmission protocol being for effecting a reliable information transmission;
    an analysis control module for analyzing said received information, for identifying said type of said internal code used, and converting it into a type of internal code identifiable by said recipient device; and a central processing module for performing a calculation oriented process based on instructions sent from said analysis control module and sending back a calculation result to said analysis control module;

a storage module for storing data required by said analysis control module when said central processing module performs a calculation, said storage module being implemented as random access memory (RAM) and read only memory (ROM), said RAM being operable to store information related to a control process and a calculation process and said ROM being operable to store permanent information;

a conversion table in said ROM for converting said information sent by said sender device into information having said type of said internal code compatible with said recipient device;

an identification table in said RAM for storing:
  all said types of internal codes;
  a length of said information sent from a sender device corresponding to said respective type of said internal code; and
  a number of non-frequently used words in said information corresponding to said respective type of said internal code wherein said identification table utilizes information stored in said identification table for performing the steps of:

(a) sequentially selecting a type of internal code from said identification table;

(b) sequentially reading a character in order to determine whether a value thereof is within said range of said selected type of said internal code;

(c) analyzing said character in order to determine whether said value thereof is within said range of said selected type of said internal code;

(d) determining whether said character is one of frequently used characters of said selected type of said internal code;

(e) recording said frequently used character if a result in said step (d) is positive and looping back to said step (b) irrespective of said result in said step (d);

(f) determining whether there is any of said unselected type of said internal code and looping back to said step (a) if said result is positive; and (g) converting said information sent by said sender device with respect to said types of said internal codes, analyzing an occurrence frequency of said non-frequently used words, selecting said type of said internal code which is among said non-frequently used words and has a value within said value range of said type of said internal code, and converting said received type of said internal code into one corresponding to said type of said internal code of said recipient device based on said conversion table; and a display module for decoding and showing said type of said internal code received from said recipient device, wherein said system performs the following process steps in order to identify the selected type of internal code:

checking whether data representing a character contained in said information set from a sender device is within a default range of a predetermined internal code;

discarding said internal code having a value other than said default range;

after discarding said internal code having value other than said default range, performing a conversion and an analysis on said information based on said value of said internal code thereof;

selecting a non-frequently used and qualified type of said internal code as said type of internal code;

converting said information sent from a sender device into converted information having said type of said internal code compatible with a recipient device; and displaying said converted information.

2. The system of claim 1, wherein said electronic device is a personal digital assistant.

3. The system of claim 1, wherein said electronic device is a mobile phone.

4. The system of claim 1, wherein said display module is a liquid crystal display (LCD).

\* \* \* \* \*